United States Patent
Gasser et al.

[11] Patent Number: 5,824,218
[45] Date of Patent: Oct. 20, 1998

[54] PERMANENT ESPRESSO FILTER INSERT

[75] Inventors: Ruedi Gasser, Burglen; Jurg Strub, Oberageri, both of Switzerland

[73] Assignee: Maxs AG, Sachseln, Germany

[21] Appl. No.: 550,412

[22] Filed: Oct. 30, 1995

[30] Foreign Application Priority Data

Dec. 20, 1994 [DE] Germany .................. 94 20 340 U

[51] Int. Cl.⁶ ................................. B01D 25/02
[52] U.S. Cl. .................. 210/337; 210/477; 210/489; 210/498; 99/295
[58] Field of Search ............... 210/323.1, 337, 210/477, 498, 489; 99/295

[56] References Cited

U.S. PATENT DOCUMENTS

| 4,052,318 | 10/1977 | Krebs | 210/337 |
| 5,028,328 | 7/1991 | Long | 210/477 |

FOREIGN PATENT DOCUMENTS

| 563477 | 6/1960 | Belgium . |
| 0020093A1 | 12/1980 | European Pat. Off. . |
| 1.013.020 | 4/1952 | France . |
| 41 29 814 A1 | 3/1993 | Germany . |
| 349388 | 11/1960 | Switzerland . |

*Primary Examiner*—David A. Reifsnyder
*Attorney, Agent, or Firm*—Tilton, Fallon, Lungmus & Chestnut

[57] ABSTRACT

The present invention relates to a permanent espresso filter insert for insertion into an espresso machine, the insert comprising a substantially flat filter disc which is penetrated by a plurality of filter openings substantially in the flow direction of the medium to be filtered, with a perforated disc being designed and arranged downstream of the filter disc in flow direction in such a manner that the medium to be filtered is swirled and deflected to an increased extent. With the permanent espresso filter insert of the invention, it is possible to improve the formation of the head or cream also in espresso machines having low working pressures.

14 Claims, 6 Drawing Sheets

PERMANENT ESPRESSO FILTER INSERT

The present invention relates to a permanent espresso filter insert for insertion into an espresso machine, the insert comprising a substantially flat first filter disc which is penetrated by a plurality of filter openings substantially in the flow direction of the medium to be filtered.

Permanent filter inserts of this type are generally known in espresso machines. A small metal pot which has been produced in a deep-drawing process and whose bottom plate has been perforated many times for making filter openings is often used as permanent filter insert. As far as espresso machines are concerned, attempts are normally made to improve the quality of the espressos to be made insofar as the quality depends on the preparation process and the used machine. One of the criteria playing a great role is the formation of a head or cream on the espresso, which formation substantially depends on the used device. Numerous attempts have already been made in the technical field. Lately, however, further preconditions have been set, aiming at an improvement of the espresso quality also in cases where espresso machines are used that operate at low pressures.

It is therefore the object of the present invention to provide a permanent espresso filter insert of the above-mentioned type which improves the formation of the head or cream also in espresso machines having low working pressures.

This object is achieved according to the invention in that a perforated disc is designed and arranged downstream of the filter disc in the flow direction in such a manner that the medium to be filtered is swirled and deflected to an increased extent. The arrangement of a perforated disc presents a further obstacle to the medium to be filtered in the flow path of said medium along which swirls or turbulences that contribute to the formation of a fine head or cream can be formed. It is here important to note that the medium which has already been preswirled and deflected by the filter disc can be swirled on further edges provided by the perforated disc. The perforated disc may comprise a few holes or may preferably be identical with the filter disc.

In a first embodiment in which the discs are directly positioned next to each other, the filter openings of the two discs may be offset relative to each other for improved swirling and deflection of the medium to be filtered. At least the filter openings of the perforated discs may be enlarged in the form of diffusers either additionally or exclusively. This results in an atomization of the medium to be filtered, whereby an even finer head or cream is formed. The expression "in the form of diffusers" should not be interpreted too narrowly; it suffices when the filter openings are enlarged in the direction of flow without the side walls being given a specifically curved design to enhance flow. To enable the medium to be already preswirled in an especially advantageous manner after the first filter disc, the two discs are arranged in another embodiment at a distance from one another, preferably of 0.05 mm to 4.0 mm.

It has also been found to be advantagous when the filter openings have a polygonal cross-section in at least one of the discs. This design variant of the filter openings guarantees that the flow rate of the medium varies through the cross-section of a filter opening. Such a measure ensures a further improved swirling action and thus the formation of a head or cream with a finer foam.

Since relatively thin foils which have been made in a galvanic process are used as filter discs most of the time, it may be of advantage to provide the perforated disc on its upper side with webs or knobs for supporting the filter disc. This ensures that the filter disc is always arranged at a specific distance from the perforated disc.

An especially inexpensive variant of a permanent espresso filter insert according to the present invention is achieved in that the filter disc is inserted in a metal pot whose bottom plate is designed as a supporting perforated disc.

In a further variant, the perforated disc may be made of a plastic material and already provided with webs or knobs on the upper side for supporting the galvanically produced filter disc. It is also of advantage when the discs are held in a plastic frame which has been injection-molded thereonto. The discs are thereby fixed in their position in a definite manner and safely held, with the possible sharp edge portions being covered.

In a variant, a surrounding collar of a metal pot wall may engage into the outer circumferential portion of the frame, thereby forming a coffee receiving portion inside the wall. The surrounding collar may be designed such that at least one of the discs supportingly rests thereon with its edge portion.

A relatively inexpensive design consists in that the frame is made of a plastic material and is simultaneously designed as a pot wall for forming a coffee receiving portion. The discs will then form the bottom of the pot.

Separate protection is sought in the following for another embodiment which relates to a permanent espresso filter insert, in particular according to claim 9, whose frame is made of a plastic material and has an upwardly and outwardly oriented surrounding collar of metal which is continued at least in the upper edge as a tubular metal ring forming the upper region of the pot wall. Such a design gives the pot a very high stability in the upper edge portion and can be very easily implemented in a technical injection-molding process in one operation together with the injection-molding of filter disc and perforated disc by connection to the plastic wall on the front side.

The present invention shall now be explained in more detail with reference to a drawing illustrating various embodiments, in which.

Figure 1:
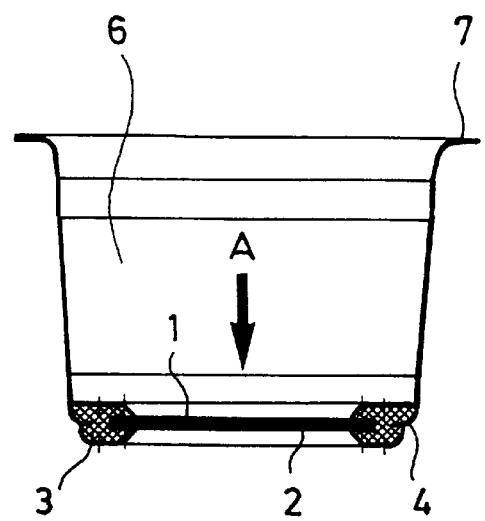
FIG. 1 shows a first embodiment of a permanent filter insert of the invention in half section.

A first embodiment of the present invention shall now be described in more detail with reference to FIGS. 1 and 2.

The permanent espresso filter insert according to the invention consists essentially of a filter disc 1 which is located at the top when viewed in flow direction A, a perforated disc 2 arranged substantially in parallel thereunder, a plastic frame 3 surrounding discs 1, 2, and a metal wall 5 provided with a radially inwardly directed collar 4. Metal wall 5 extends in a direction transverse to discs 1, 2 to form a coffee receiving portion 6 of a pot-shaped permanent filter insert in upward direction. Metal wall 5 has a surrounding support flange 7 at its upper end.

Discs 1, 2 are arranged in parallel spaced-apart relationship with each other, resulting in the formation of a substantially disc-shaped interspace 8. As can further be seen, discs 1, 2 have formed therein numerous filter openings 9, 10 that extend in flow direction A through discs 1, 2. Filter openings 9, 10 are provided in the form of diffusers. This means that they are cross-sectionally enlarged when viewed in flow direction A. Moreover, the filter openings 9 of filter disc 1 are offset relative to the filter openings 10 of the perforated disc 2.

Discs 1, 2 comprise each a plurality of penetrations 11, 12 distributed over their outer edge portion, into which corresponding plastic material of the plastic frame 3 has penetrated for fixing discs 1, 2 during the injection molding process.

To this end, the surrounding collar 4 of metal wall 5 comprises recesses—into which plastic material of the plastic frame 3 has also penetrated during the injection molding process. As can further be seen, collar 4 also serves to directly support discs 1 and 2, so that the width of interspace 8 depends thereon.

The operation/function of the above embodiment shall now be explained in more detail.

Figure 2:
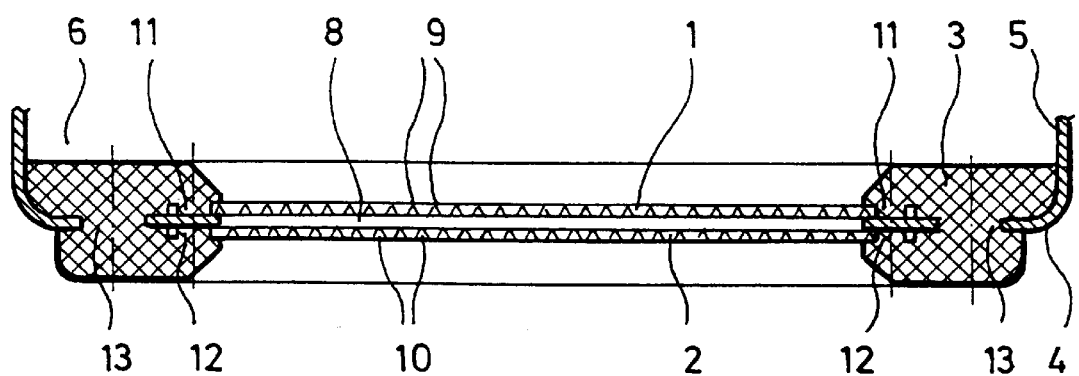
FIG. 2 is an enlarged illustration of the filter disc portion of the permanent filter insert according to FIG. 1.

The permanent espresso filter insert shown in FIGS. 1 and 2 is inserted into the corresponding place on an espresso machine, and the coffee receiving portion 6 is filled with a corresponding amount of espresso powder. Water is subsequently evaporated and pressed in flow direction A through the powder provided inside the coffee receiving portion 6. Since the permanent espresso filter insert of the invention should also be used in large machines having low working pressures, this is preferably done at pressures of 6 to 8 bar. The medium to be filtered reaches the filter disc 1 and flows downwards through the filter openings 9 in flow direction A. The medium to be filtered is swirled and atomized due to the diffusor shape of the filter openings 9, penetrating in this state into interspace 8. For an improved swirling effect, the filter openings 9 may also have a polygonal cross-section. The preswirled medium flows from interspace 8 into the filter opening 10 of the perforated disc 2. Another swirling operation takes place there, ensuring even at low pressures that a fine head or cream is formed on the espresso, which is to be intercepted thereunder in a receiving container.

Further embodiments of the present invention shall now be explained in the following with reference to various figures. Identical reference numerals are used for identical or similar components. It is only the essential modifications that are discussed in the following.

Figure 3:
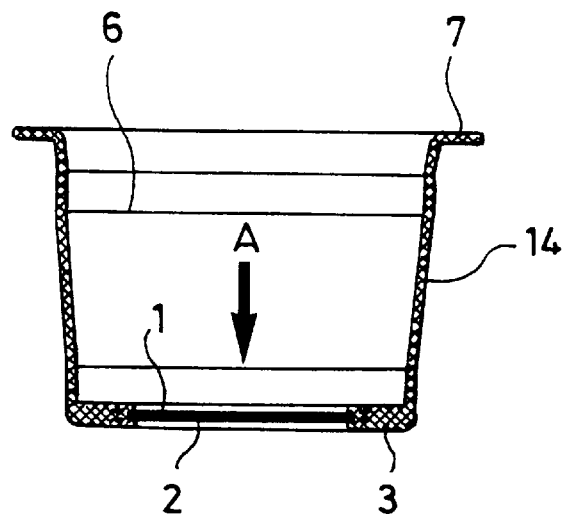
FIG. 3 shows a second embodiment of a permanent filter insert of the invention in half section.
Figure 4:
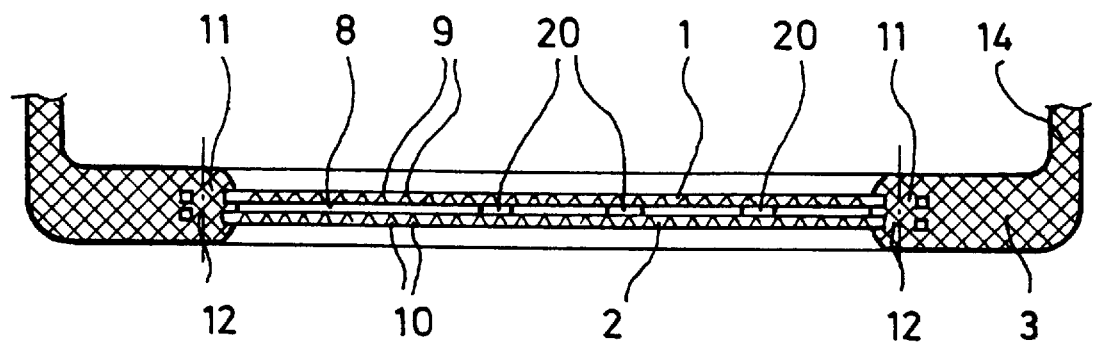
FIG. 4 is an enlarged illustration of the filter disc portion of the permanent filter insert of FIG. 3.

A second embodiment shall be explained with reference to FIGS. 3 and 4. The plastic frame 3 in which the edge portions of discs 1, 2 are embedded is made integral with the wall 14 in this embodiment, the wall being also made from a plastic material. Such a design has the advantage that both the frame 3 and the wall 14 including the support flange 7 arranged thereon can be made in a single injection-molding process at low costs. On its upper side, the performated disc 2 has a-plurality of webs or knobs 20 which support the filter disc 1 at a distance relative to the perforated disc 2.

Figure 5:
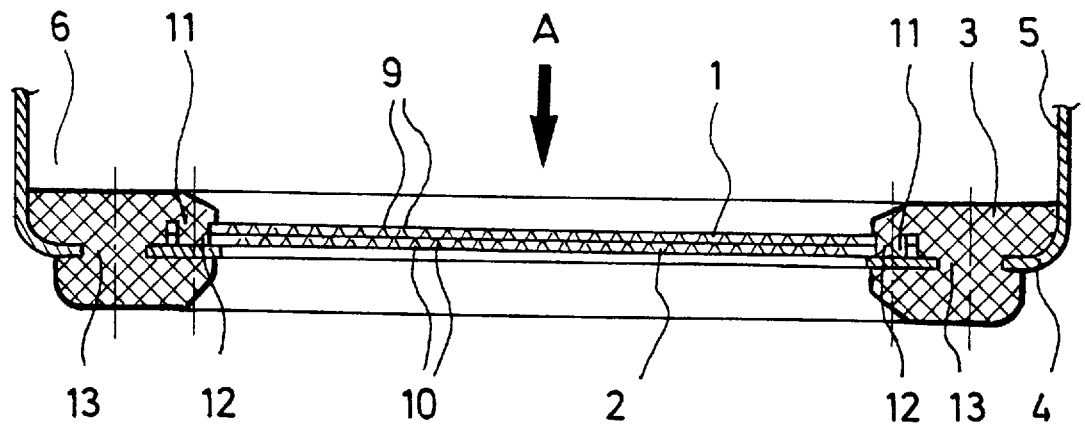
FIG. 5 is an enlarged partial view of a third embodiment of the present invention.
Figure 6:
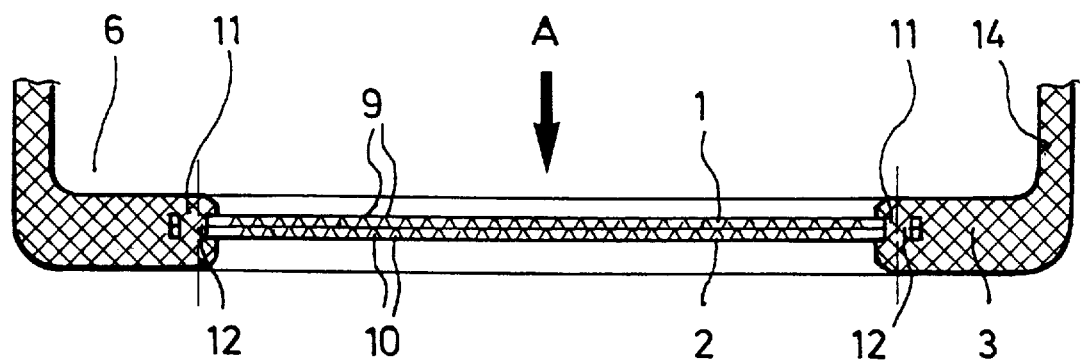
FIG. 6 is an enlarged partial view of a fourth embodiment of the present invention.

In the embodiment of FIG. 5, the only difference is that both discs 1, 2 are arranged directly above one another, optionally at a very small distance from one another. This offers, in particular, technical manufacturing advantages. The embodiment of FIG. 6 shows such an arrangement of the discs 1, 2 directly one upon the other together with a plastic frame 3 and a plastic wall 14 integrally arranged thereon.

Figure 7:
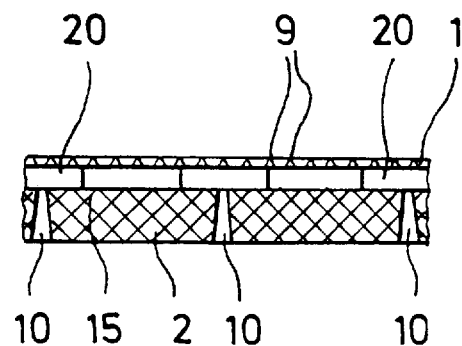
FIG. 7 is an enlarged partial view of a fifth embodiment of the present invention.

In the fifth embodiment of FIG. 7, a perforated disc 15 of plastics is arranged below the filter disc 1 and has its upper side provided with a plurality of plastic webs or knobs 20 which support the first filter disc 1 at some distance from the distributor disc 15. The perforated disc 15 may be seated on the plastic frame 3 by means of a step 21 thereon. It should here be noted that the webs or knobs 20 may also be arranged such that an extended flow channel is created for the filter medium to be filtered, so that the medium is not guided directly radially to the filter openings 10. The filter openings 10 are made very small in this variant and are also designed in the form of diffusers to create another swirling effect.

Figure 8:
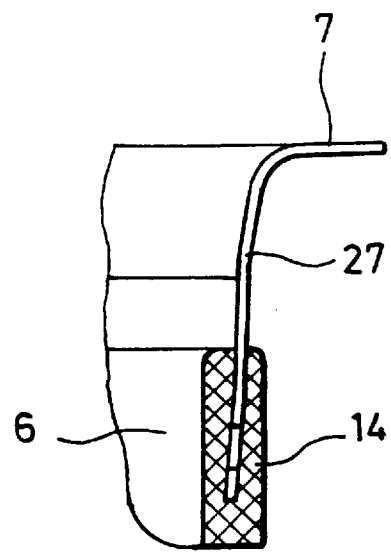
FIG. 8 is an enlarged partial view of a connection variant of a metal ring with a plastic wall.

Separate protection is sought for the embodiment shown in FIG. 8. Wall 14 on plastic frame 3 is here only raised to a specific height, and a tubular metal ring 27 which can be connected to wall 14 by means of an injection-molding process is inserted into the wall at the front side. On its lower end portion, metal ring 27 may have penetrations into which plastic material penetrates. This embodiment achieves a reinforcement of the upper edge portion of the pot-shaped permanent filter insert without the lower end section of the tubular metal ring 27 requiring any special processing. As a result, expensive process steps, such as deep-drawing of a lower collar, are not necessary.

Figure 9:
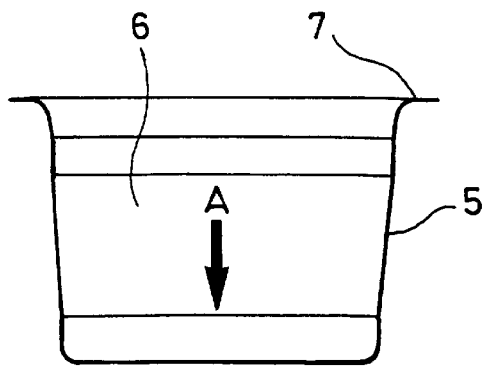
FIG. 9 shows a metal pot for a sixth embodiment of the present invention.
Figure 10:
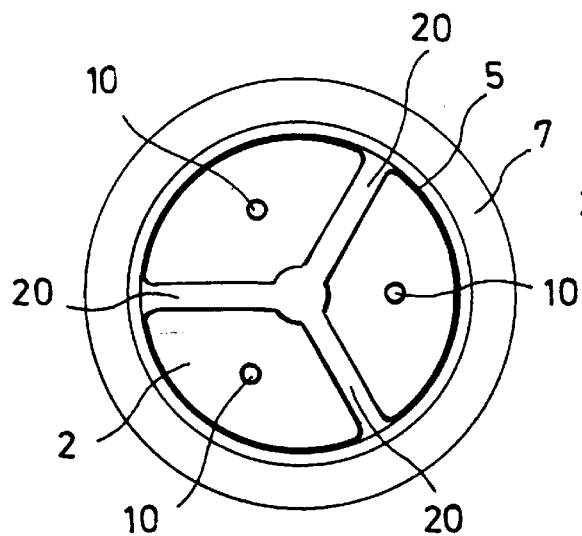
FIG. 10 is a top view of a bottom plate variant of the metal pot of FIG. 9.
Figure 11:
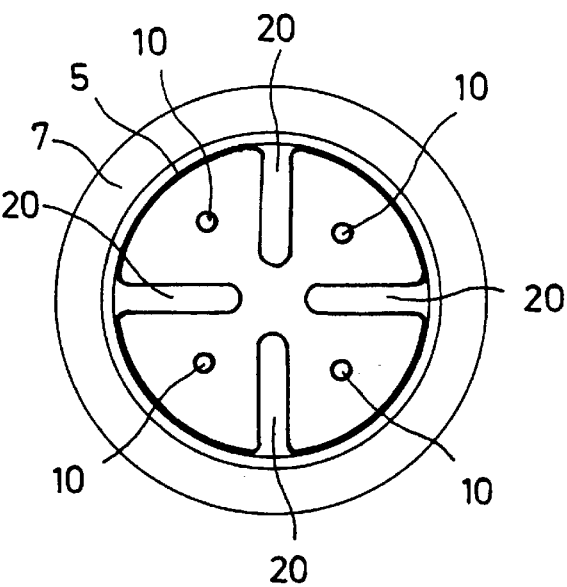
FIG. 11 is a top view of another bottom plate variant of the metal pot of FIG. 9.
Figure 12:
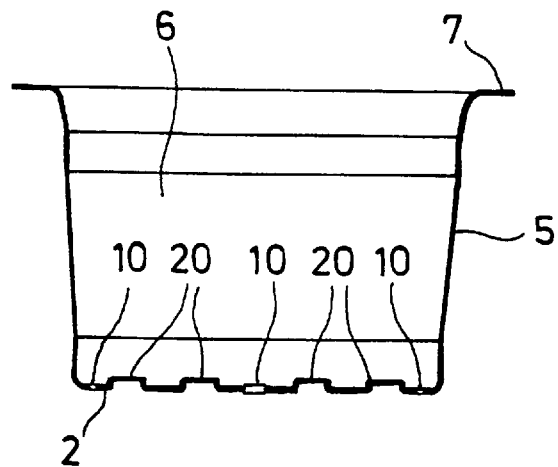
FIG. 12 shows a metal pot for a seventh embodiment of the present invention.
Figure 13:
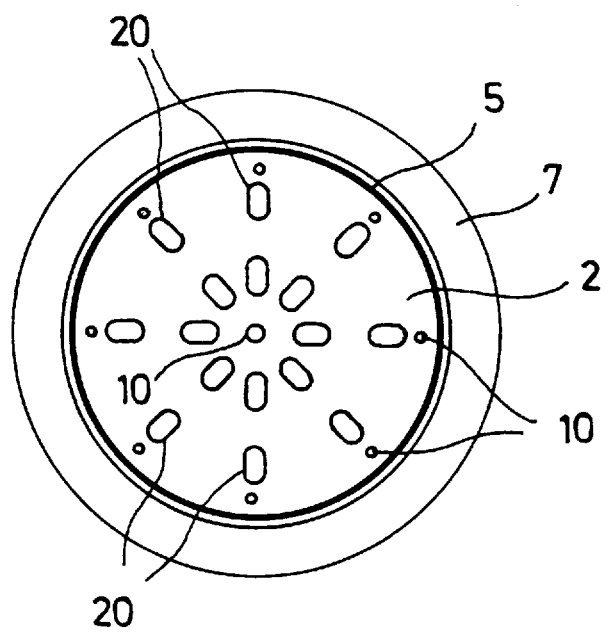
FIG. 13 is a top view of the metal pot of FIG. 12.

In the embodiment of FIG. 9, the permanent filter insert comprises a metal pot with a corresponding metal wall 5 and a perforated metal disc 2 formed as a bottom plate of the pot. The perforated disc 2 comprises filter openings. As becomes apparent from FIGS. 9 and 10, the perforated disc 2 has corresponding impressions (see also FIGS. 11 and 12), resulting in the formation of webs or knobs 20 on which the filter discs 1, 2 rest.

It goes without saying that the above-described embodiments permit numerous combinations with one another; for instance, instead of a metal construction, a corresponding plastic structure is possible for the permanent filter insert.

We claim:

1. Permanent espresso filter insert for insertion into an espresso machine, having a substantially flat filter disc which is penetrated by a plurality of filter openings substantially in a flow direction of a medium to be filtered, the improvement comprising that a perforated disc also having a plurality of filter openings substantially in the flow direction of the medium to be filtered is designed and arranged downstream of said filter disc in the flow direction, said perforated disc being provided with swirl inducing edges by means of which the medium to be filtered undergoes increased swirling and deflection.

2. The permanent espresso filter insert according to claim 1, wherein said filter openings of said filter disc and said perforated disc are offset relative to one another.

3. The permanent espresso filter insert according to claim 1 or 2, wherein at least said filter openings of said perforated disc are enlarged conical openings.

4. The permanent espresso filter insert according to claim 1, wherein said filter disc and said perforated disc are arranged at a distance of 0.05 mm to 4.0 mm from one another.

5. The permanent espresso filter insert according to claim 1, 2, or 4, wherein said filter openings have a polygonal cross-section in at least one of said filter disc and said perforated disc.

6. The permanent espresso filter insert according to claim 1, 2, or 4, wherein said perforated disc includes webs or knobs on its upper side for supporting said filter disc.

7. The permanent espresso filter insert according to claim 1, 2 or 4, wherein said filter disc is inserted in a metal pot whose bottom plate is formed as said perforated disc.

8. The permanent espresso filter insert according to claim 1, 2 or 4, wherein said perforated disc is made of plastic.

9. The permanent espresso filter insert according to claim 1, wherein said filter disc and said perforated disc are held in a plastic frame which is injection-molded thereonto.

10. The permanent espresso filter insert according to claim 9, wherein a surrounding collar of a metal pot wall engages into an outer circumferential portion of said plastic frame and a coffee receiving portion is thereby formed in the interior of said wall.

11. The permanent espresso filter insert according to claim 10, wherein at least one of said filter disc and said perforated disc supportingly rests with its edge portion on said surrounding collar.

12. The permanent espresso filter insert according to claim 9, wherein said frame provides a pot wall for forming a coffee receiving portion.

13. The permanent espresso filter insert according to claim 12, wherein said frame comprises an upwardly and outwardly oriented surrounding collar of metal which is continued at least in an upper edge as a tubular metal ring which forms an upper portion of said pot wall.

14. The permanent espresso filter insert according to claim 13, wherein said metal ring is secured to said filter disc and said perforated.

* * * * *